Patented Sept. 19, 1950

2,522,586

UNITED STATES PATENT OFFICE 2,522,586

ALKYD RESINS PREPARED FROM TRICAR-BOXYLIC ACID HAVING THE STRUCTURAL FORMULA OF THE ADDITION PRODUCT OF l-PIMARIC ACID AND FUMARIC ACID

Raymond P. Silver, Chester, Pa., assignor to Hercules Powder Company, Wilmington, Del., a corporation of Delaware No Drawing. Application August 24, 1946,
Serial No. 692,918

13 Claims. (Cl. 260—22)

This invention relates to a new synthetic resin, more particularly to a new synthetic resin of the modified alkyd type, and to methods of preparing the same.

It is known that l-pimaric acid and maleic anhydride react under suitable conditions to give a crystalline adduct. This adduct is a synthetic tricarboxylic acid which has the definite composition of one mole of maleic anhydride in chemical combination with one mole of l-pimaric acid, see Wienhaus and Sandermann, Ber. 69, 2202–6 (1936); also U. S. 2,359,980, to Fleck. The adduct has a melting point by the capillary method of about 228° C. and an acid number in acetone solution of about 421 in the pure recrystallized form.

The l-pimaric acid-maleic anhydride adduct may be used as a polycarboxylic acid and reacted with a polyhydric alcohol and usually a drying or nondrying oil or fatty acid derived therefrom to provide an alkyd resin having interesting and useful properties. These resins are characterized by good initial color, and they retain their initial color reasonably well. However, they are seriously deficient with respect to exterior durability. On exterior exposure, films containing a substantial amount of these resins break down rapidly. Surface imperfections develop in the films, and the exposed areas are soon attacked by the elements.

In accordance with this invention, a modified alkyd resin is prepared by reacting together a material having the structural formula of the Diels-Alder adduct of l-pimaric acid and fumaric acid, with a polyhydric alcohol and a fatty acid substance of the group consisting of fatty oils and fatty acids derived therefrom. The resin resulting from the interaction of these components has, in contrast to those derived from the l-pimaric acid-maleic anhydride adduct, good exterior durability characteristics. This resin may be formulated on the basis of a drying or nondrying oil (or fatty acids derived therefrom), and depending upon the formulation may be used as the sole film-former of a coating composition or in conjunction with the other film-formers as for example in nitrocellulose lacquers. Such coating compositions comprising the novel modified alkyd resin of this invention provide films which, in addition to having good initial and retained color, are very durable. The films retain their initial flexibility for long periods of time and do not develop surface imperfections when given exterior exposure.

The material having the structural formula of the Diels-Alder adduct of l-pimaric acid and fumaric acid referred to in the previous paragraph has the following structural formula:

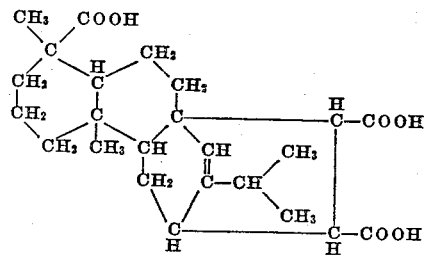

wherein the carboxyl groups attached to adjacent carbon atoms are trans to each other.

The material having the structural formula of the Diels-Alder adduct of l-pimaric acid and fumaric acid used in preparing the novel resins described herein is derived from the Diels-Alder addition product of l-pimaric and maleic anhydride. To prepare this material, the Diels-Alder addition product of l-pimaric acid and either maleic acid or maleic anhydride, together with a sufficient amount of alkaline material to neutralize the mixture completely, is heated in water solution at 150–300° C., heating being continued for a period of time sufficient to effect substantially complete isomerization of the maleic structural group to the corresponding fumaric group. The l-pimaric acid-fumaric acid adduct is then recovered from the aqueous solution by cooling the solution and acidifying the same to precipitate the adduct.

The substantially pure material having the structural formula of the Diels-Alder adduct of l-pimaric acid and fumaric acid is characterized by an acid number in acetone solution of 397–405. When precipitated from solution in benzene by the addition of isopropyl alcohol, the adduct has a melting point of 255–257° C. by the capillary method. When associated with 1.5 mols of acetic acid of crystallization per mol of addition product, the product is characterized by an (alpha)$_D^{24}$ of plus 29–33° in 2% solution in absolute ethyl alcohol, a per cent hydroxyl radical by the Zerewitinoff method of 15.0–15.5, a per cent carbon of 63.8–64.3, and a per cent hydrogen of 7.8–8.3.

Having thus indicated in a general way the nature and purpose of this invention, the following examples are included to illustrate the practice thereof.

PREPARATION OF THE l-PIMARIC ACID-FUMARIC ACID ADDUCT

Example 1

150 parts of the Diels-Alder addition product of l-pimaric acid and maleic anhydride (melting point of 226° C. by the capillary method, acid number in acetone solution of 422, acid number in absolute alcohol solution of 281, and (alpha)$_D^{24}$ in 2% solution in absolute ethyl alcohol of plus 27), 45 parts of anhydrous sodium hydroxide, and 305 parts of water were placed in a nickel lined autoclave under a pressure of 1800 lbs./sq. in. gage of nitrogen. Reaction was carried out at 225° C. for a period of four hours using continued agitation. After cooling to room temperature, the solution was diluted with dioxane in the ratio of one volume of dioxane for every five volumes of solution. The solution was then completely acidified with hydrochloric acid, and the l-pimaric acid-fumaric acid adduct separated therefrom. The amount of adduct recovered represented a yield of 93% (140 parts having an acid number of 398). When precipitated from solution in benzene by the addition of isopropyl alcohol, the product had a melting point by the capillary method of 255-257° C. Also from solution in acetic acid, this material precipitated in association with 1.5 mols of acetic acid of crystallization and this product containing the acetic acid of crystallization had the following properties:

(Alpha)$_D^{24}$ in 2% solution in ethyl alcohol of plus 31°
Per cent hydroxyl by the Zerewitnoff method of 15.0-15.5
Per cent carbon of 64.0-64.1, and
Per cent hydrogen of 8.0-8.1

RESIN PREPARATION

Example 2

A mixed coconut oil fatty acid-cottonseed oil fatty acid monoglyceride was prepared by the alcoholysis of the corresponding oils using the following formulation:

| | Parts |
|---|---|
| Coconut oil | 210 |
| Cottonseed oil | 24 |
| Glycerin | 62 |
| Calcium hydroxide | 0.234 |

The ingredients were heated with agitation at 235° C. until 1 part by volume of the product gave a clear solution when added to 4 parts by volume of methanol.

Using the resulting mixed coconut-cottonseed oil fatty acid monoglyceride, an alkyd resin was prepared using the following formulation:

| | Parts |
|---|---|
| Coconut-cottonseed fatty acid monoglyceride | 400 |
| Coconut fatty acids | 55 |
| l-Pimaric acid-fumaric acid adduct | 279 |
| Glycerin | 10 |

The first two reactants were heated to 180° C. with agitation over a period of 55 minutes. The l-pimaric acid-fumaric acid adduct was then slowly added to the reaction mixture over a period of 7 minutes. Thereafter, the reaction mixture was heated to 200° C. and held for 4¼ hours at that temperature. At the end of this period the resin had an acid number of 56.2. Ten grams of glycerin were then added and the reaction mixture held for one hour at 200° C. The reaction mixture was sparged with $CO_2$ during the entire period of reaction. The resulting resin had an acid number of 36.0. A 60% solids solution of the resin in Tollac had a Gardner-Holdt viscosity of less than A. Tollac is a nonacid, water-white aromatic hydrocarbon solvent having a specific gravity of .865 to .875 at 15.6° C., a distillation range between 81° C. and 135° C., and a flash point below 20° F. The fatty acid content of this resin based on the total charge amounted to approximately 47.5%. This figure includes combined fatty acid as well as free fatty acid used to make the resin.

A clear nitrocellulose lacquer was prepared using the resin of Example 2. RS ½ sec. nitrocellulose was employed and the ratio of nitrocellulose to resin was 1 to 3. The lacquer was sprayed on steel panels and films having excellent initial color were obtained. The panels were given exterior exposure in Florida, and it was found that after 16 weeks' exposure, the films were entirely intact and evidenced no surface imperfections. In contrast to this, panels sprayed with similarly formulated lacquers containing an alkyd resin made from the l-pimaric acid-maleic anhydride adduct evidenced considerable rusting due to film disintegration and embrittlement after 4-5 days' exposure.

Example 3

An alkyd resin was prepared on the basis of the following formulation:

| | Parts |
|---|---|
| Coconut-cottonseed fatty acids monoglyceride (same as Example 2) | 240 |
| Glycerin | 50 |
| l-Pimaric acid-fumaric acid adduct | 279 |

The first two reactants were heated to 150° C. with agitation over a 20 minute period. The adduct was then added and the reaction mixture heated to 200° C. over a period of 30 minutes. The reaction mixture was then held at 200° C. until a resin having an acid number of 40.0 resulted. The reaction mixture was sparged with $CO_2$ as in Example 2. A 60% solids solution of this resin in Tollac had a Gardner-Holdt viscosity of Y-Y. The fatty acid content of this resin based on the total charge amounted to approximately 31.5%.

Example 4

An alkyd resin was prepared on the basis of the following formulation:

| | Parts |
|---|---|
| Coconut-cottonseed fatty acid monoglyceride (same as Example 1) | 480 |
| Coconut fatty acids | 110 |
| l-Pimaric acid-fumaric acid adduct | 279 |

The first two reactants were heated to 180° C. with agitation over a period of 55 minutes. The adduct was then slowly added over a period of 30 minutes, and the reaction mixture was heated to 200° C. Heating was continued at this temperature until a resin having an acid number of 25.9 was obtained. The reaction mixture was sparged with $CO_2$ as in Example 2. A 60% solution of this resin in Tollac had a viscosity of A on the Gardner-Holdt scale. The fatty acid content of this resin base don the total charge amounted to approximately 53.9%.

Example 5

An alkyd resin was prepared on the basis of the following formulation:

| | Parts |
|---|---|
| Coconut oil fatty acids | 220 |
| Pentaerythritol | 139 |
| l-Pimaric acid-fumaric acid adduct | 279 |

The first two reactants were heated to 200–220° C. with agitation over a period of one hour. The reaction mixture was held at that temperature until the acid number was slightly less than 10. The adduct was then slowly added over a period of ½ hour, and the reaction mixture was maintained at 200–220° C. until the product having an acid number less than 30 was obtained. During the preparation of the resins, carbon dioxide was used as a sparge. The fatty acid content of this resin based on this total charge amounted to approximately 34.5%.

Example 6

An alkyd resin was prepared on the basis of the following formulation:

| | Parts |
|---|---|
| Glycerin | 130 |
| Soybean fatty acids | 473 |
| l-Pimaric acid-fumaric acid adduct | 279 |

Using rapid agitation and a carbon dioxide sparge, all of the ingredients were heated to 220–240° C. over a period of two hours and held at that temperature until the acid number of 10 was obtained. The fatty acid content of this resin based on the total charge amounted to approximately 53.8%.

Example 7

An alkyd resin was prepared on the basis of the following formulation:

| | Parts |
|---|---|
| Glycerin | 170 |
| Linseed fatty acids | 846 |
| l-Pimaric acid-fumaric acid adduct | 279 |

Using rapid agitation and a carbon dioxide sparge, the ingredients were heated to 220° C. over a period of three hours and held at that temperature until a resin having an acid number of 8 was obtained. The fatty acid content of this resin based on the total charge amounted to approximately 65.3%.

The resins of Examples 2–4 inclusive were tested in clear nitrocellulose lacquer compositions to determine the maximum sprayable solids content thereof, in comparison with a commercial coconut oil-modified glyceryl phthalate resin in which the fatty acid content (on the basis of total charge) was substantially the same as the fatty acid content of the resin of Example 3. RS ½ sec. nitrocellulose was employed, and a ratio of 1 part of nitrocellulose to 3 parts of alkyd resin was employed in making all the tests. A standard lacquer solvent having the following composition was employed:

| | Parts |
|---|---|
| Butyl acetate | 35 |
| Butanol | 15 |
| Toluene | 50 |

All viscosities were measured with the Ubbelohde viscometer. Determinations were made at 25° C. ± 1° C. It was decided for the purpose of this test that a viscosity of 80 cps. represents the maximum viscosity usable with standard spray equipment available today. The following table lists the results of the tests in the form of the solids content of the various lacquers at maximum viscosities for spraying purposes, i. e., 80 cps.

| Resin | Percent Fatty Acid Modification | Percent Solids at 80 cps. (Ubbelohde Viscometer) |
|---|---|---|
| Commercial Coconut Oil—Modified Glyceryl Phthalate | 31.5 | 22 |
| Example 2 Resin | 47.5 | 30 |
| Example 3 Resin | 31.5 | 28 |
| Example 4 Resin | 53.9 | 28 |

Most presently available commercial alkyds when used in the ratio of 1 part of RS ½ sec. nitrocellulose to 3 parts of alkyd are sprayable at a maximum of about 22% solids. An increase of 2% solids is considered a very substantial improvement. As evidenced by the above table, the use of alkyds prepared from the l-pimaric acid-fumaric acid adduct in lacquer formulations makes it possible to increase the sprayable solids concentration from 6 to 8% above the usual solids concentration. This very substantial advantage makes it possible to do a particular job using fewer coats to obtain films of the desired thickness.

It will be understood that the l-pimaric acid-fumaric acid adduct used in accordance with this invention does not have to be prepared in accordance with the method of Example 1. Any other method for the preparation of this adduct may be employed, and it is intended that the invention described herein is of such scope that it covers the use of the l-pimaric acid-fumaric acid adduct in making the resins described regardless of the method of its preparation.

Although glycerol and pentaerythritol are shown in the examples, any polyhydric alcohol may be used to provide alkyd resins embodying the inventive concept herein described. Thus, dihydric alcohols such as ethylene glycol, diethylene glycol, triethylene glycol, tetraethylene glycol, nonaethylene glycol, etc., trihydric alcohols such as glycerol, trimethylolpropane, etc., tetrahydric alcohols such as pentaerythritol, erythrol, etc., pentahydric alcohols such as arabitol, etc., hexahydric alcohols such as dipentaerythritol, mannitol, corbitol, etc., may be employed.

The amount of polyhydric alcohol to employ in any instance will be sufficient to esterify all the acid groups present, with or without an excess thereof in accordance with the teaching of the art. Usually, an excess of from 5% to 30% of polyhydric alcohol over that theoretically required will be employed. However, an excess of as much as 40% over theory may be used as desired.

With respect to modification of the basic alkyd complex, any fatty acid substance may be employed. Thus, any nondrying fatty oil may be employed and the fatty acids obtainable therefrom. Also, fatty oils characterized by the ability to dry when spread in thin films and the fatty acids obtainable therefrom may be employed Examples of the nondrying fatty oils are coconut, castor, babassu, palm, peanut, etc., oils. Examples of the drying oils are cottonseed, hempseed, linseed, oiticica, perilla, poppyseed, safflower, soybean, sunflower, tung, etc., oils. Not only can the natural fatty acid mixtures obtained from the aforementioned nondrying and drying oils be employed in accordance with this invention, but relatively pure specific fatty acids derived from such natural fatty acid mixtures may be employed. Thus, fatty acids of from 8 to 22 carbon atoms may be used as for example saturated fatty acids such as caprylic, capric, lauric, myristic, palmitic, stearic, arachidic, behenic, lignoceric, etc., mono-olefinic fatty acids such as lauroleic, myristoleic, palmitoleic, oleic, erucic, ricinoleic, etc., di-olefinic fatty acids such as linoleic, etc., tri-olefinic fatty acids such as linolenic, elaeostearic, licanic, etc. As shown in the examples, the fatty acid substance employed in preparing the resins may consist of a mixture of fatty oil and fatty acid.

The amount of fatty acid employed in making the subject resins is a critical factor and certain limitations must be observed to obtain practical and useful resins having the desirable properties of the resins described herein. In general, the amount of fatty acid should be at least about 30% of the total reactants and not more than about 70% of the total reactants; preferably, the fatty acid content should be from about 35% to about 55% of the total reactants. In the case where a fatty oil or fatty oil-fatty acid mixture is employed in making the resin, in contradistinction to a fatty acid per se, it will be understood that the fatty acid equivalent of such fatty oil or fatty oil-fatty acid mixture is to be used to determine the fatty acid content of the resin. The fatty acid equivalent may be defined as the theoretical amount of fatty acids which could be obtained by hydrolysis or other means from a fatty oil or fatty oil-fatty acid mixture.

Additional modification of the resins described herein may be made using a rosin acid. For example, wood or gum rosin, or the acids derivable therefrom, may be so used. Also, polymerized rosin, hydrogenated rosin, heat-treated rosin, disproportionated rosin, etc., may be employed. Rosin acid modification is used herein to mean modification with any of the aforementioned rosin types. When rosin acid modification is used, the rosin acid employed should not exceed about 25% of the total weight of the reactants.

In preparing the resins of this invention, there are in general three methods which may be employed. In the first and preferred method the fatty oil is alcoholyzed using a desired polyhydric alcohol, as specifically described in Example 2. To alcoholyze the oil, a temperature of from 200° C. to 260° C., preferably from 220° C. to 240° C. is employed. The second step involves reaction of the alcoholyzed oil with the 1-primaric acid-fumaric acid adduct until a product having the desired acid number is obtained. Reaction temperatures for this second step are from 190° C. to 260° C., preferably from 200° C. to 220° C. If desired, a small amount of polyhydric alcohol may be added to the reactants in the final stages of resinification to aid in the preparation of low acid number resins. Such a two step process involving alcoholysis and resinification is exemplified by Example 2 supra. As a modification of this first and preferred method, instead of alcoholyzing an oil, a partial ester may be prepared directly by reacting the desired fatty acids and alcohol.

The second general method of preparing the subject resins involves reacting the fatty oil (or fatty acids), polyhydric alcohol and 1-pimaric acid-fumaric acid adduct together simultaneously at a temperature of from 190° C. to 260° C., preferably from 200° C. to 220° C. When this method is employed in conjunction with the use of oil, it is preferred to use at least a small amount of fatty acids in addition to the oil to avoid gelation tendencies.

The third general method involves a first step of reacting the 1-pimaric acid-fumaric acid adduct with the alcohol to a predetermined acid number at a temperature of from 180° C. to 230° C. This step is followed by reaction of the high acid number resin with a fatty oil or fatty acid at a temperature of from 200° C. to 220° C. until the desired acid number is reached. It is preferred to use fatty acid in carrying out the second step of this process The resins produced in accordance with this invention have several marked advantages when used as film-formers in protective coating compositions. Films containing the resins possess the good initial color and color retention of films containing alkyd resins prepared from the 1-pimaric acid-maleic anhydride adduct. Thus, clear films containing the subject resins are initially substantially free from color and do not afteryellow. At the same time, films containing these resins possess far superior durability on exterior exposure as compared with films containing resins prepared from the 1-pimaric acid-maleic anhydride adduct. Due to the superior durability, these new resins find application in many fields which have been closed to the resins derived from the 1-pimaric acid-maleic anhydride adduct.

Not only are the subject resins improved from the standpoint of exterior durability, but they inherently have substantally lower solution viscosities in lacquer solvents than do the commercially available oil-modified glyceryl phthalate alkyds. This is a very important characteristic and one which permits the formulation of lacquers having a substantially greater solids content at maximum sprayable viscosity in comparison with the commercially available glyceryl phthalate alkyds. By taking advantage of this characteristic of these new resins, economies can be made in the number of applications necessary to do a job and in the amount of thinner required.

The alkyd resins of this invention derived from nondrying fatty oils or fatty acids are especially useful as plasticizers for nitrocellulose lacquers for both wood and metal surfaces. They may also be used as plasticizers for ureaformaldehyde resins, melamine-formaldehyde resins, chlorinated rubber, etc. Those resins derived from drying oils or fatty acids are particularly useful as film-formers in air-drying and baking coating compositions.

All parts and percentages in the specification and claims refer to a weight basis unless otherwise expressly stated.

As many widely different embodiments of this invention may be made without departing from the spirit and scope thereof, it is to be understood that the invention is not to be limited to the specific embodiments thereof, except as defined in the appended claims.

What I claim and desire to protect by Letters Patent is:

1. A synthetic resin resulting from the reaction of a tricarboxylic acid having the following structural formula:

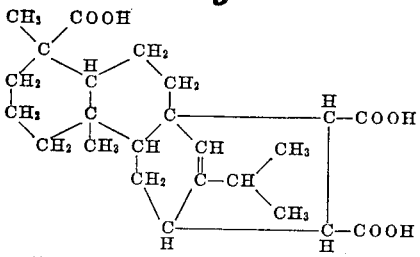

wherein the carboxyl groups attached to adjacent carbon atoms are trans to each other, a polyhydric alcohol having no substituents other than the hydroxyl groups which are reactive with the other reactants, and a fatty acid substance selected from the group consisting of fatty oils and fatty acids derived therefrom, said fatty acid substance being present in such amount that the fatty acid equivalent thereof amounts to from 30% to 70% of the total reactants.

2. A synthetic resin resulting from the reaction of a Diels-Adler addition product of l-pimaric and maleic anhydride in which the maleic anhydride group has been converted through hydration and isomerization to a fumaric acid group, a polyhydric alcohol having no substituents other than the hydroxyl groups which are reactive with the other reactants, and a fatty acid substance selected from the group consisting of fatty oils and fatty acids derived therefrom, said fatty acid substance being present in such amount that the fatty acid equivalent thereof amounts to from 30% to 70% of the total reactants.

3. A synthetic resin resulting from the reaction of a Diels-Adler addition product of l-pimaric acid and maleic acid in which the maleic acid group has been isomerized to a fumaric acid group, a polyhydric alcohol having no substituents other than the hydroxyl groups which are reactive with the other reactants, and a fatty acid substance selected from the group consisting of fatty oils and fatty acids derived therefrom, said fatty acid substance being present in such amount that the fatty acid equivalent thereof amounts to from 30% to 70% of the total reactants.

4. A synthetic resin resulting from the reaction of a tricarboxylic acid having the structural formula set forth in claim 1, a polyhydric alcohol having no substituents other than the hydroxyl groups which are reactive with the other reactants, and at least one fatty acid substance selected from the group consisting of fatty oils and fatty acids derived therefrom, the total fatty acid substance being present in such amount that the fatty acid equivalent thereof amounts to from 30% to 70% of the total reactants.

5. A synthetic resin resulting from the reaction of a tricarboxylic acid having the structural formula set forth in claim 1, a polyhydric alcohol having no substituents other than the hydroxyl groups which are reactive with the other reactants, a rosin acid, and a fatty acid substance selected from the group consisting of fatty oils and fatty acids derived therefrom, said rosin acid being present in an amount not greater than about 25% of the total reactants, said fatty acid substance being present in such amount that the fatty acid equivalent thereof amounts to from 30% to 70% of the total reactants.

6. A synthetic resin resulting from the reaction of a tricarboxylic acid having the structural formula set forth in claim 1, a polyhydric alcohol having no substituents other than the hydroxyl groups which are reactive with the other reactants, and a drying oil fatty acid, said drying oil fatty acid being present in the amount of from 30% to 70% of the total reactants.

7. A synthetic resin resulting from the reaction of a tricarboxylic acid having the structural formula set forth in claim 1, a polyhydric alcohol having no substituents other than the hydroxyl groups which are reactive with the other reactants, and a nondrying fatty oil, said oil being present in such amount that the fatty acid equivalent thereof amounts to from 30% to 70% of the total reactants.

8. A synthetic resin resulting from the reaction of a tricarboxylic acid having the structural formula set forth in claim 1, glycerol and soybean fatty acids, said soybean fatty acids being present in the amount of from 30% to 70% of the total reactants.

9. A synthetic resin resulting from the reaction of a tricarboxylic acid having the structural formula set forth in claim 1, glycerol and a nondrying fatty oil, said nondrying fatty oil being present in such amount that the fatty acid equivalent thereof amounts to from 30% to 70% of the total reactants.

10. A synthetic resin resulting from the reaction of a tricarboxylic acid having the structural formula set forth in claim 1, pentaerythritol and a nondrying oil fatty acid, said nondrying oil fatty acid being present in the amount of from 30% to 70% of the total reactants.

11. A synthetic resin resulting from the reaction of a tricarboxylic acid having the structural formula set forth in claim 1, glycerol and coconut oil, said coconut oil being present in such amount that the fatty acid equivalent thereof amounts to from 30% to 70% of the total reactants.

12. A synthetic resin resulting from the reaction of a tricarboxylic acid having the structural formula set forth in claim 1, pentaerythritol and coconut oil fatty acids, said coconut oil fatty acids being present in the amount of from 30% to 70% of the total reactants.

13. A synthetic resin resulting from the reaction of a tricarboxylic acid having the structural formula set forth in claim 1, a polyhydric alcohol having no substituents other than the hydroxyl groups which are reactive with the other reactants, and a nondrying oil fatty acid, said nondrying oil fatty acid being present in the amount of from 30% to 70% of the total reactants.

RAYMOND P. SILVER.

REFERENCES CITED

The following references are of record in the file of this patent:

UNITED STATES PATENTS

| Number | Name | Date |
| --- | --- | --- |
| 2,033,133 | Ellis | Mar. 10, 1936 |
| 2,059,948 | Holt | Nov. 3, 1936 |
| 2,272,057 | Cheetham | Feb. 3, 1942 |
| 2,346,968 | Jeuck et al. | Apr. 18, 1944 |
| 2,359,980 | Fleck | Oct. 10, 1944 |
| 2,381,486 | Cohen et al. | Aug. 7, 1945 |
| 2,409,930 | Cox | Oct. 22, 1946 |
| 2,447,750 | Harris | Aug. 24, 1948 |

OTHER REFERENCES

Ruzicka and Bacon, J. Soc. Chem. Ind. 55, 546 (1936).